(12) United States Patent
Caruso

(10) Patent No.: US 10,034,572 B2
(45) Date of Patent: Jul. 31, 2018

(54) BEVERAGE AGITATOR-FROTHER

(71) Applicant: Steven Jerome Caruso, Antioch, IL (US)

(72) Inventor: Steven Jerome Caruso, Antioch, IL (US)

(*) Notice: Subject to any disclaimer, the term of this patent is extended or adjusted under 35 U.S.C. 154(b) by 170 days.

(21) Appl. No.: 15/169,300

(22) Filed: May 31, 2016

(65) Prior Publication Data

US 2016/0345771 A1    Dec. 1, 2016

Related U.S. Application Data

(63) Continuation-in-part of application No. 14/813,102, filed on Jul. 29, 2015, now abandoned.

(60) Provisional application No. 62/031,124, filed on Jul. 30, 2014, provisional application No. 62/144,420, filed on Apr. 8, 2015.

(51) Int. Cl.
*B01F 3/04* (2006.01)
*A47J 31/44* (2006.01)
*A47L 13/12* (2006.01)
*B01F 7/00* (2006.01)
*B01F 13/08* (2006.01)

(52) U.S. Cl.
CPC ......... *A47J 31/4485* (2013.01); *A47L 13/12* (2013.01); *B01F 3/04453* (2013.01); *B01F 7/0045* (2013.01); *B01F 7/00558* (2013.01); *B01F 7/00566* (2013.01); *B01F 13/0872* (2013.01); *B01F 2215/0006* (2013.01); *B01F 2215/0022* (2013.01)

(58) Field of Classification Search
CPC ... A47J 31/4485; A47L 13/12; B01F 3/04453; B01F 7/0045; B01F 7/00558; B01F 7/00566; B01F 13/0872; B01F 2215/0006; B01F 2215/0022
USPC ............... 261/91, 92, DIG. 26; 426/474
See application file for complete search history.

(56) References Cited

U.S. PATENT DOCUMENTS

| | | | | |
|---|---|---|---|---|
| 9,833,753 B2* | 12/2017 | Guo | ............... | B01F 3/04453 |
| 2010/0326284 A1* | 12/2010 | Volz | ............... | A47J 27/004 |
| | | | | 99/323.1 |
| 2012/0000372 A1* | 1/2012 | Vanni | ............... | A47J 31/4489 |
| | | | | 99/323.1 |
| 2012/0007260 A1* | 1/2012 | Lin | ............... | A47J 36/165 |
| | | | | 261/142 |

* cited by examiner

*Primary Examiner* — Charles Bushey

(57) ABSTRACT

A device for the convenient frothing or mixing or agitating of milk or other liquids is disclosed. The unit may take many forms, but common to nearly all is that the user simply pours or dispenses the liquid from the devices vessel or holding area, and as the fluid flows to the devices exit spout, the fluid is frothed, thus providing a "Pour to Froth" experience.

20 Claims, 7 Drawing Sheets

BEVERAGE AGITATOR-FROTHER

RELATED APPLICATIONS

This application is a continuation-in-part of U.S. Ser. No. 14/813,102, filed Jul. 29, 2015, which claims the benefit of U.S. provisional application Ser. No. 62/031,124 filed on Jul. 30, 2014, and also provisional application Ser. No. 62/144,420 filed on Apr. 8, 2015. The entire disclosure of the above-listed patent applications and their prosecution history to date relating to frothers is hereby incorporated by reference herein to provide continuity of disclosure.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates generally to the preparation of beverages whether they be hot or cold. More specifically, the invention relates to the mixing or agitation of a beverage and in most cases the frothing or entraining of air into the beverage. Usually, the beverage is milk or dairy based product but may be soy or any other suitable liquid.

There are frothers commercially available however, they all have limitations—not limited to the quantity they can prepare, that time it takes, to prepare and in the amount of cleanup required.

BRIEF SUMMARY OF THE INVENTION

The present invention is intended to provide an improved means of frothing liquids such as milk to be used in coffee drinks or frothing or and mixing other drinks such as hot chocolate or cocoa.

BRIEF DESCRIPTION OF SEVERAL VIEWS OF THE DRAWINGS

The following reference characters are used in the drawings of refer to the parts of the present invention. Like reference characters indicate like or corresponding parts in the respective views.

Figure 1:
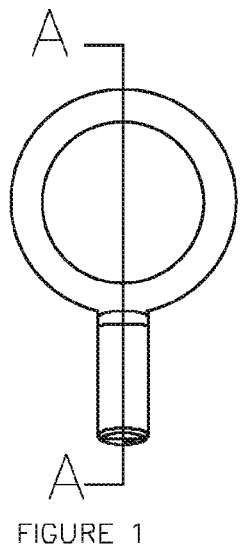
FIG. 1 is a top view of one embodiment of the invention.
Figure 4:
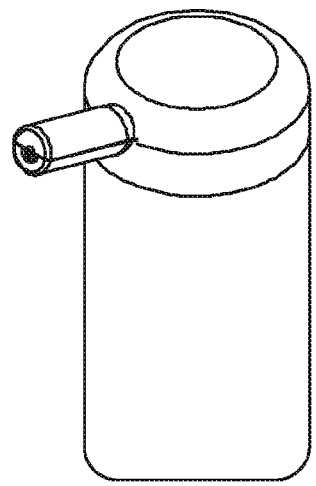
FIG. 4 is a trimetric view of FIGS. 1-3.
Figure 2:
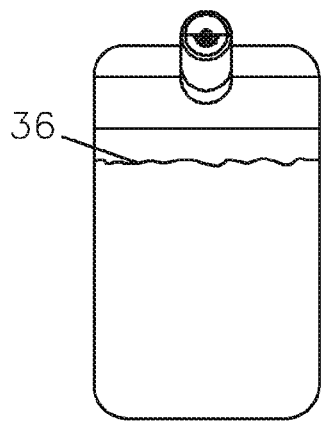
FIG. 2 is a front elevation of the invention of FIG. 1.
Figure 3:
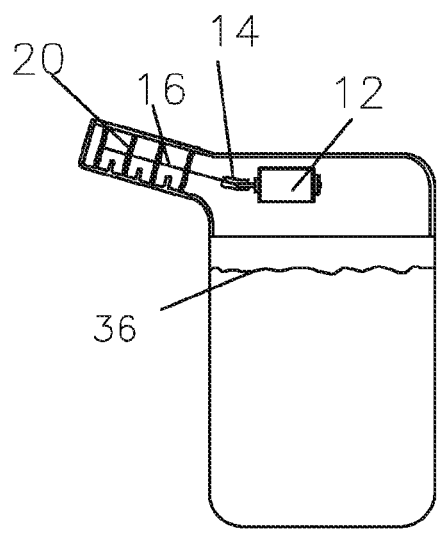
FIG. 3 is a side sectional elevation of the invention of FIG. 1, the section being taken along section plane A-A.
Figure 5:
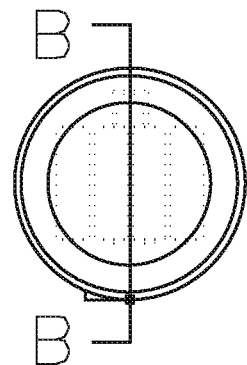
FIG. 5 is a top view of another embodiment of the invention.
Figure 8:
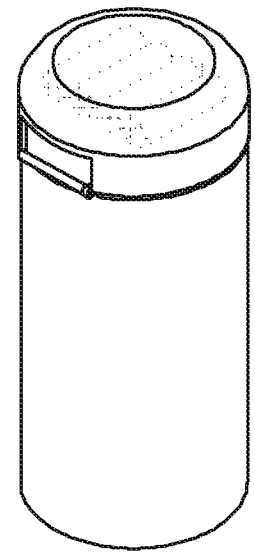
FIG. 8 is a trimetric view of FIGS. 5-8.
Figure 6:
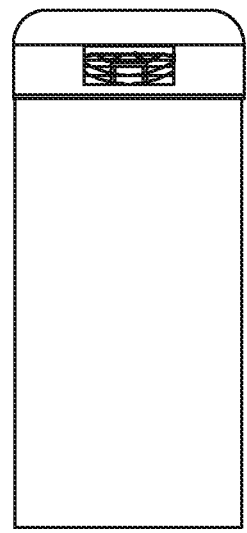
FIG. 6 is a front elevation of the invention of FIG. 5.
Figure 7:
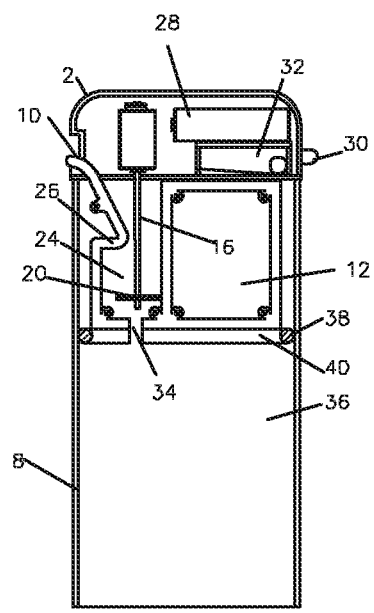
FIG. 7 is a side sectional elevation of the invention of FIG. 5, the section being taken along section plane B-B.
Figure 9:
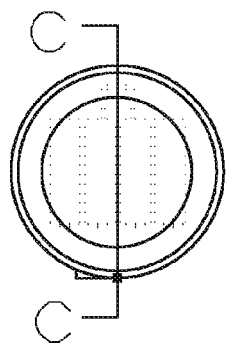
FIG. 9 is a top view of another embodiment of the invention.
Figure 12:
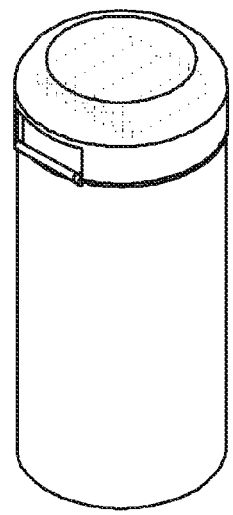
FIG. 12 is a trimetric view of FIGS. 9-11.
Figure 10:
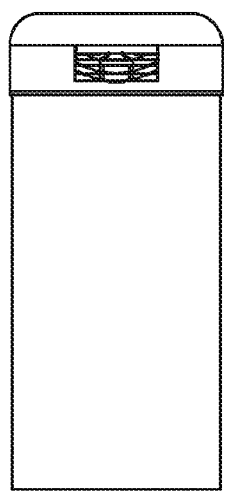
FIG. 10 is a front elevation of the invention of FIG. 1.
Figure 11:
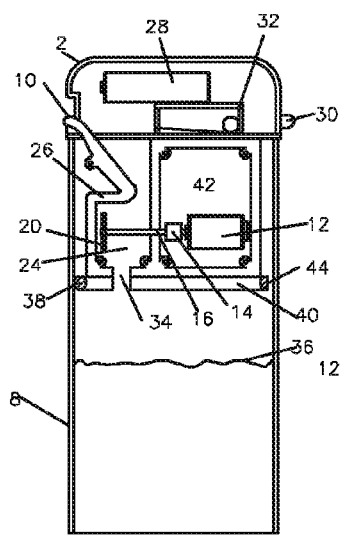
FIG. 11 is a side sectional elevation of the invention of FIG. 1, the section being taken along section plane C-C.
Figure 13:
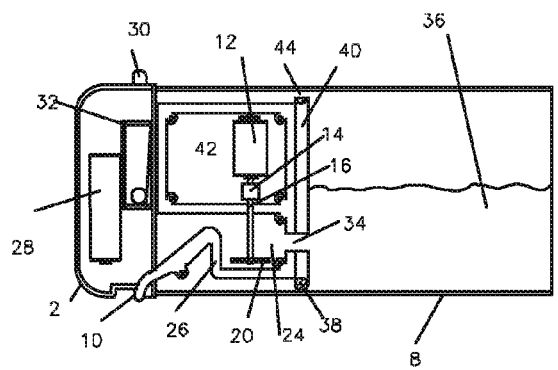
FIG. 13 is a view substantially the same as that of FIG. 11, but rotated to show the flow of liquid into the well 24, and then out the spout 10.

2—Lid/housing structure
8—Vessel body
10—Spout
12—Motor
14—Motor Coupling
16—Shaft
18—Baffles
20—Agitator/wisk
24—Frothing Well Area
26—Retention wall
28—Batteries
30—Switch 1
32—Switch 2
34—Flow orifice
36—Fluid
38—O-Ring or Seal
40—Baffle Wall
42—Motor Chamber
44—Vent/check valve

DETAILED DESCRIPTION OF THE INVENTION

While the invention will be described in connection with several preferred embodiments, it will be understood that the invention is not limited to these embodiments. On the contrary, the invention includes all alternatives, modifications, combinations, and equivalents as may be included within the spirit and scope of the appended claims.

There are several features that are common to all the embodiments. A beverage to be mixed or froth is put into a carafe and then by simply pouring the liquid from the carafe, the liquid is mixed, and/or aerated so that by the time the liquid is in a glass, cup, plate or other vessel, the state of the liquid has been altered.

As previously mentioned, there are other appliances for the mixing or frothing of beverages/milk based beverages. These units require you to pour milk into them, turn them on, and then wait. These units often also incorporate a heating element. Because the volume of the milk expands, these units often can only froth about enough for one drink at a time. So often they are limited in volume. Also, milk does not froth nearly as well once it is warm versus it being cold. So once the unit has prepared one beverage/gone through a cycle, frothing capability is diminished and continues to diminish as the unit heats up. Some units will not run a second cycle until the carafe is cooled by ambient air or under running water. These units also take a long time to prepare the beverage anywhere from 2 minutes to 5 minutes. Those that are able to froth greater quantities take longer and additionally require the user to make larger quantities for the unit to operate properly. So the units that make a single serving and those that make more have little to no control over the quantity of the batch. One is stuck with the batch size designed into the machine. Furthermore, these units need to be cleaned after every use before they can be stored.

Contrast this with the invention at hand. A user simply removes a carafe of milk from the refrigerator (optionally) and pours it into the cup or glass they are to drink from. The froth produced is maximized, as the milk is cold, and the user may then use it as is (it could have poured it into coffee as well) or microwave the milk/froth to heat it up, as it has been found through experimentation that micro waving after the froth has been maximized with cold milk actually stiffens the froth. There is no cleanup and the user simply puts the carafe back into the refrigerator for the next use. The only thing to clean is the cup or glass used for consuming the beverage.

It should be noted that the present invention may also be used with a separate heating pot/vessel instead of a microwave. In this case the advantages of increased froth production are still realized, however, cleanup has been increased. It should also be noted that it is fully anticipated and part of the invention that the carafe may be constructed of an insulating material, or construction (double wall or other) such that the unit does not have to be refrigerated at all times and may be left out at coffee stations and the like. And/or similarly to other machines, the milk or cocoa may be put into the device every time it is used, and thus fluids are never "stored" for extended periods in the device.

Referring to FIG. 1, one embodiment of the present invention can be seen. In this embodiment of he the invention the frothing occurs in this spout of the unit. There are batteries, 2, which are in electrical communication with a motor, 12. The motor 12, is attached to frothing element/disk 20, by mechanical means such as being coupled to a shaft 16, via coupling 14, which may be resilient to accommodate angular differences in geometry, manufacturing etc. or through a magnetic coupling. Magnetic coupling has the advantage of not requiring a breach in the motor wall, and thus the motor is able to be reliably sealed off. There are switches. One switch may be a main power switch, and another switch may be a position sensitive switch. So that when the first switch "on" and the unit is tipped into a pouring position, the positional switch may be closed, or actuated by way of a swinging or rolling etc. positional element of switch and the motor 12 is energized. This causes frothing disk(s) 20, to spin, thus frothing the milk as it is being poured. Additionally, the switches may have multiple positions, making so there is a speed control, to further effect the amount of frothing. Annular ribs 24, or other forms of corrugation may be introduced, as it has been found advantageous to slow the flow of the fluid so that it may be properly frothed before it can flow over each rib or "speed bump". Additionally, multiple agitators have been used on the same shaft/motor with success.

Referring to FIGS. 5-8 another preferred embodiment can be seen. There are similarities, and also some significant differences from the previous embodiment. In this embodiment the fluid is held in the lower part of the carafe. A baffle wall 40 and orifice 34 restricts the flow of fluid into frothing well/sub-chamber 24. It can be seen in FIG. 7 that the chamber 24 forms a well, once the unit has been rotated/tipped into its in use position generally 90 degrees from its out of use position. The orifice 34, slows the flow into the well, and the agitator/frother disk 20, aerates the liquid causing it to increase in volume and thus rise relative to retention wall 26 and exit spout 10. Continued liquid flow and pressure from orifice 34, further causes the foam to rise, and flow over retention wall 26. Retention wall 26, serves to control the flow by acting as a dam until the liquid has been frothed. Simultaneously, more new liquid/milk is flowing into the bottom of the well, further pushing the froth up over wall 26 and then flow out exit spout 10.

Referring to FIGS. 9-13 another preferred embodiment can be seen. Here too, there are similarities, and also some significant differences from the previous embodiments. A major difference of FIGS. 9-14 versus 5-8 is the orientation of the agitator 20, with reference to the well. It has been found that this is an important distinction is frothing/agitating efficacy. And while the motor orientation of FIGS. 5-8 could be couple to bevel gearing etc. to achieve the same final orientation, complexity, cost, clean ability etc. then become factors.

Figure 14:
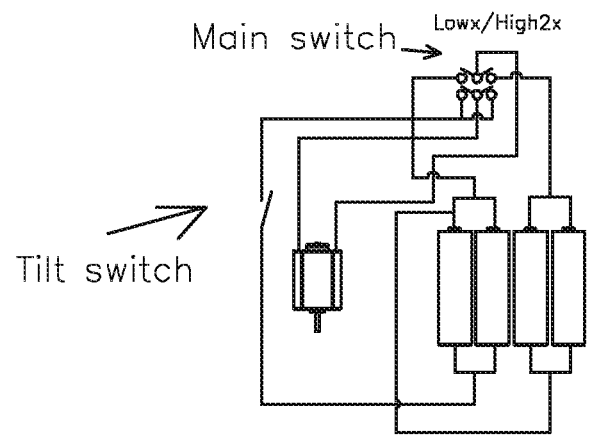
FIG. 14 is a wiring schematic showing how two voltages may be used to achieve two agitation/frothing speeds.

So again referring to FIGS. 9-14, with emphasis on the sectional views 11 and 13, this embodiment of the invention will be described. The user may turn on the unit on and additionally, switch 30 may have multiple positions, making it so there is a speed control, to further effect the amount of frothing. FIG. 14, outlines one way of achieving speed control, by altering the way in which the batteries are wired in series and parallel, so that the voltage may be varied between 2 sets of cells in series and parallel together for 3 volts and all four cells run in parallel for 1.5 volts, thus balancing the load evenly over all the cells. The current set-up, specifically as depicted in FIG. 14, using a double pole, double throw switch does only use 2 cells for the lower voltage setting thus an unbalanced use of the cells. However, by using a switch with a greater number of poles balancing can be achieved and is anticipated. So once the unit is "on" it is ready for the second switch, 32 to make the final closure of the circuit and energize motor 12. This occurs when the unit is tipped, as switch 32 is a tilt switch. As depicted, it is a conductive ball switch, but it just as easily could be a swing switch, a momentary switch outfitted with moving ballast, or other known forms of tilt/orientation switches. So the user tilts the unit, as one would to pour its contents to another container and switch 32 is closed energizing the motor 12, and thus spinning frothing disk(s) 20. It should be noted that the unit could also function with a single (either/or) switch as well, so the terminology main switch could be applied to the tilt switch as well if it were the only switch employed. It has been found that more than one frothing disk(s) 20, may be stacked, (not graphically depicted as stacked), for greater efficacy. So the unit has gone from the orientation generally of FIG. 11 now to a position generally that of FIG. 13. It can also be seen in FIGS. 11 and 13 that the chamber 24 forms a well, once the unit has been rotated/tipped into its in use position generally 90 degrees from its out of use position as in FIG. 13. A baffle wall 40 and orifice 34 restricts the flow of fluid 36, into frothing well/sub-chamber 24. The orifice 34, slows the flow into the well, and the agitator/frother disk 20, aerates the liquid causing it to increase in volume and thus rise relative to retention wall 26 and exit spout 10. A vacuum break has been found to be necessary to allow air to enter to replace the liquid leaving. Such a break could be a vent hole such as 44, depicted simply as a notch in the sealing ring area 38, oriented to least likely pass liquid. A more sophisticated one way valve only allowing air in and not liquid to escape could also be employed to allow air to replace the liquid as it flows out. The volume of liquid flow and pressure from orifice 34, further causes the foam to rise, and flow over retention wall 26. Retention wall 26, serves to control the flow by acting as a dam until the liquid has been frothed enough that it may flow over the retention wall 26. Simultaneously, more new liquid/milk is flowing into the bottom of the well, further pushing the froth up over wall 26 and then flow out exit spout 10. Once the user has poured enough froth, the user simply does what comes natural, brings the container into a generally upright position, thus opening switch 32, which shuts the unit off. A small amount of the frothed liquids still in the well 24, area, de-froths and returns to the main storage chamber/vessel 8 via orifice 34. The unit may now be ready for another cycle, or even simply put back into the refrigerator for another time. The fluid 25 that was frothed may be used as is, or micro waved or heated in some manner. It has been found that this heating with a microwave after actually stiffens the froth further. An alternative is to heat the fluid in vessel 8, prior to frothing. While this has some desirability, it has been found that higher quality froth is obtained by post heating. It should also be noted that the agitator, 20 could be magnetically coupled through the wall that shaft 16 passes through. Thus making all the chambers, such as motor chamber 42 sealed from each other. Referring again to FIG. 13, an alternative embodiment will be described. In this embodiment the unit is used in a relatively stationary position. In this stationary position, main storage chamber/vessel 8 can have an additional opening and optionally a lid/cap (not shown). When the user pours liquid to be agitated and/or frothed into the chamber/vessel 8, which could also just be a small staging area, the machine performs as has already been described, dispensing froth into a user's waiting cup etc. In yet another embodiment orifice 34, further includes a valve structure (not shown). In this way, the main storage chamber/vessel 8 may hold liquid to be agitated and/or frothed, then when the user, or another input, presses a button lever etc. the valve structure is opened allowing liquid to be agitated and/or frothed to flow to the frothing chamber and then dispensing froth into a user's waiting cup, another holding chamber etc. as has already been described. These embodiments serve to demonstrate that the invention need not be always "tippable" to function with some similarities as in other embodiments, and still has many, if not all, of the advantages of other embodiments. And another embodiment contemplates using a variable flow restrictor or orifice 34, or variable flow valve. In this way another variable concerning froth rate etc. may be accounted for. Additionally, it has been found that the flow rate changes depending on how full the storage chamber/vessel 8 is due to variable pressure. By being able to control the rate of flow variably, a slower or faster frothing process is achievable, and thus the user, or the system by way of sensors or other feedback may alter the froth produced by altering the flow rate via a variable valve or other such structure.

As touched on earlier with reference to FIG. 14, if there are 4 batteries/cells, a switch can be provided switching between all 1.5 cells in series for 6 volts, or two sets of two cells in parallel for 3 volts/longer battery life. Or alternatively the two sets of two cells in parallel for 3 volts and a single set in parallel for 1.5 volts. Alternatively yet, any or all of the above voltage combinations could be utilized for various frothing/power scenarios. This could be a useful strategy for increased frothing or could provide two settings for two levels of froth.

Figure 15:
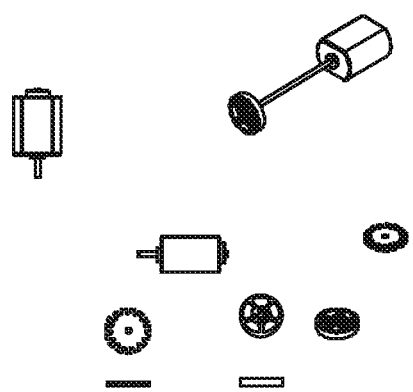
FIG. 15 is a collection of different agitators used and experimented with in top and trimetric views, as well as various views of one example motor/shaft.

FIG. 15 is a collection of different agitators used and experimented with in top and trimetric views, as well as various views of one example of a motor/shaft.

Figure 16:
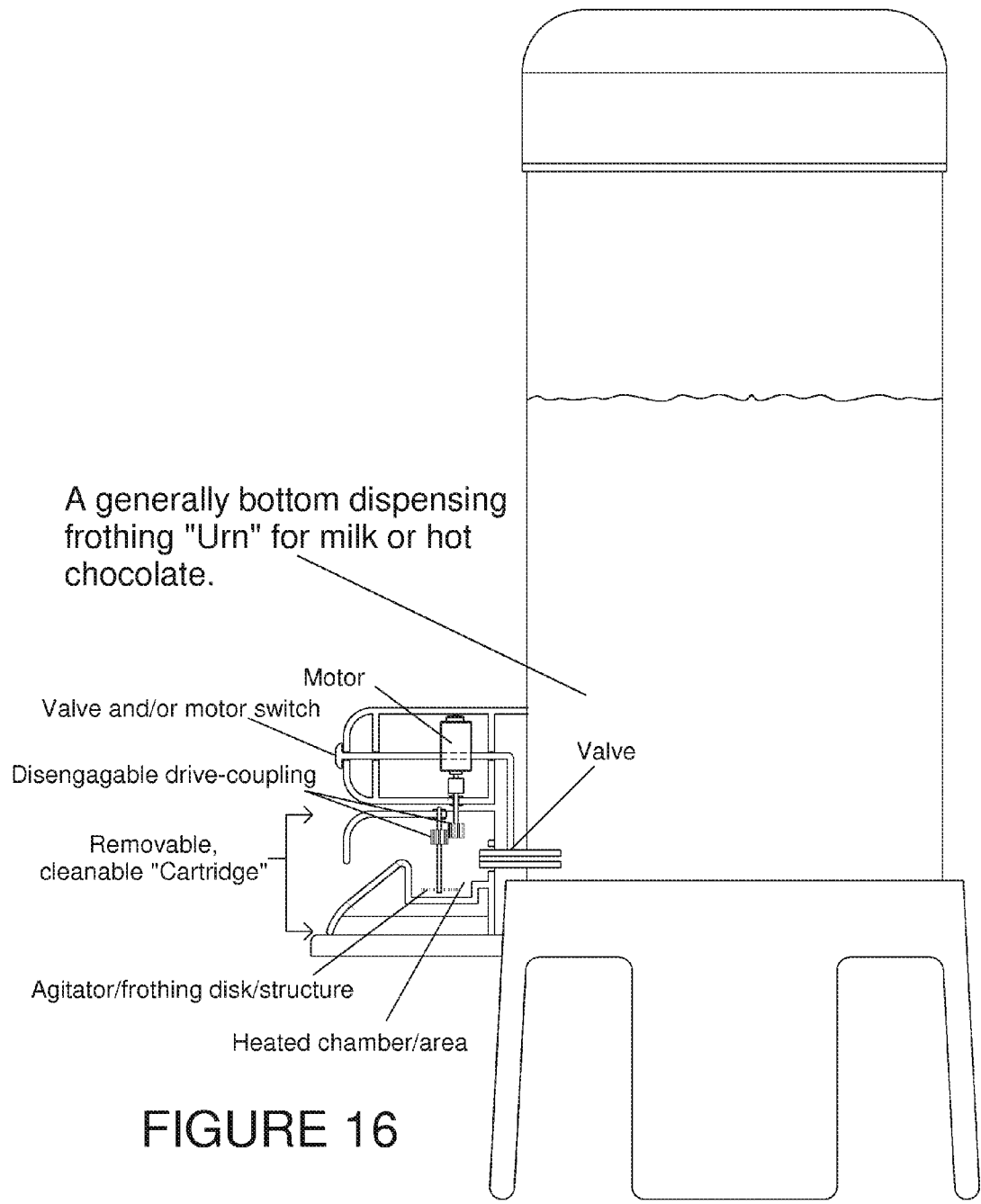
FIG. 16 is a side sectional elevation of a generally bottom dispensing, frothing "urn".

Referring to FIG. 16, a generally bottom dispensing frothing "Urn" for milk or hot chocolate can be seen. This figure shows that the unit may have separate discretely heated areas. In this way, the entire vessel does not need to be heated to produce warm or heated froth. And so the milk or liquid to be agitated/frothed may be maintained at a cooler temperature, which not only is better for frothing, but also for the shelf life of the product. The unused volume can be just put away back into refrigeration without it having to be subjected to the spoilage danger zone of between approx. 50-140 degrees. What can also be seen, is that optionally, a smaller volume of fluid/milk can/could be maintained in the heated area at a temperature above the danger zone, warmed and ready to be frothed where its volume will increase, fresh fluid will also be introduced via the valve and thus it will climb over the retaining wall/dam as has already been described.

Figure 17:
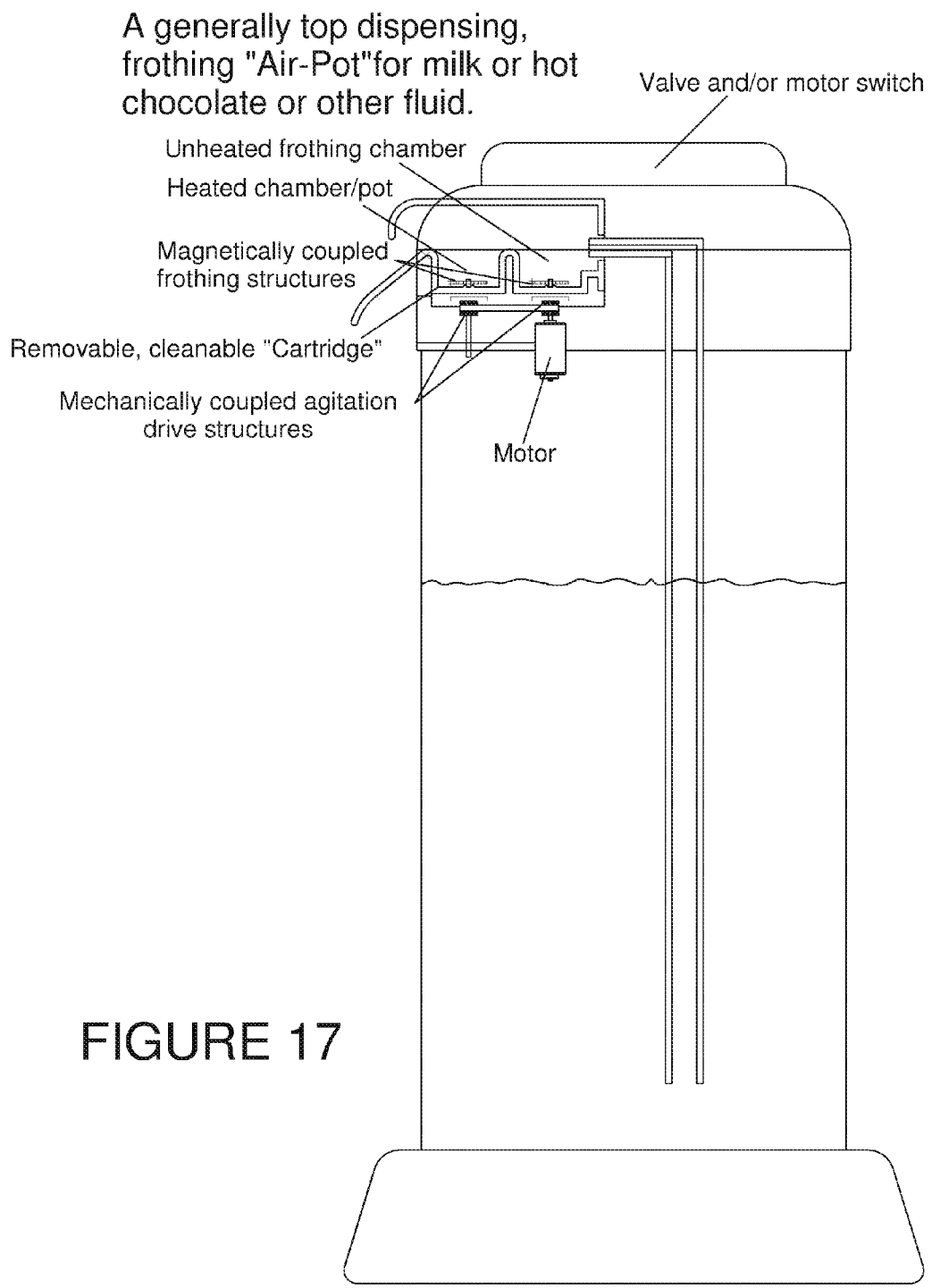
FIG. 17 is a side sectional elevation generally top dispensing, frothing "air-pot".
Figure 18:
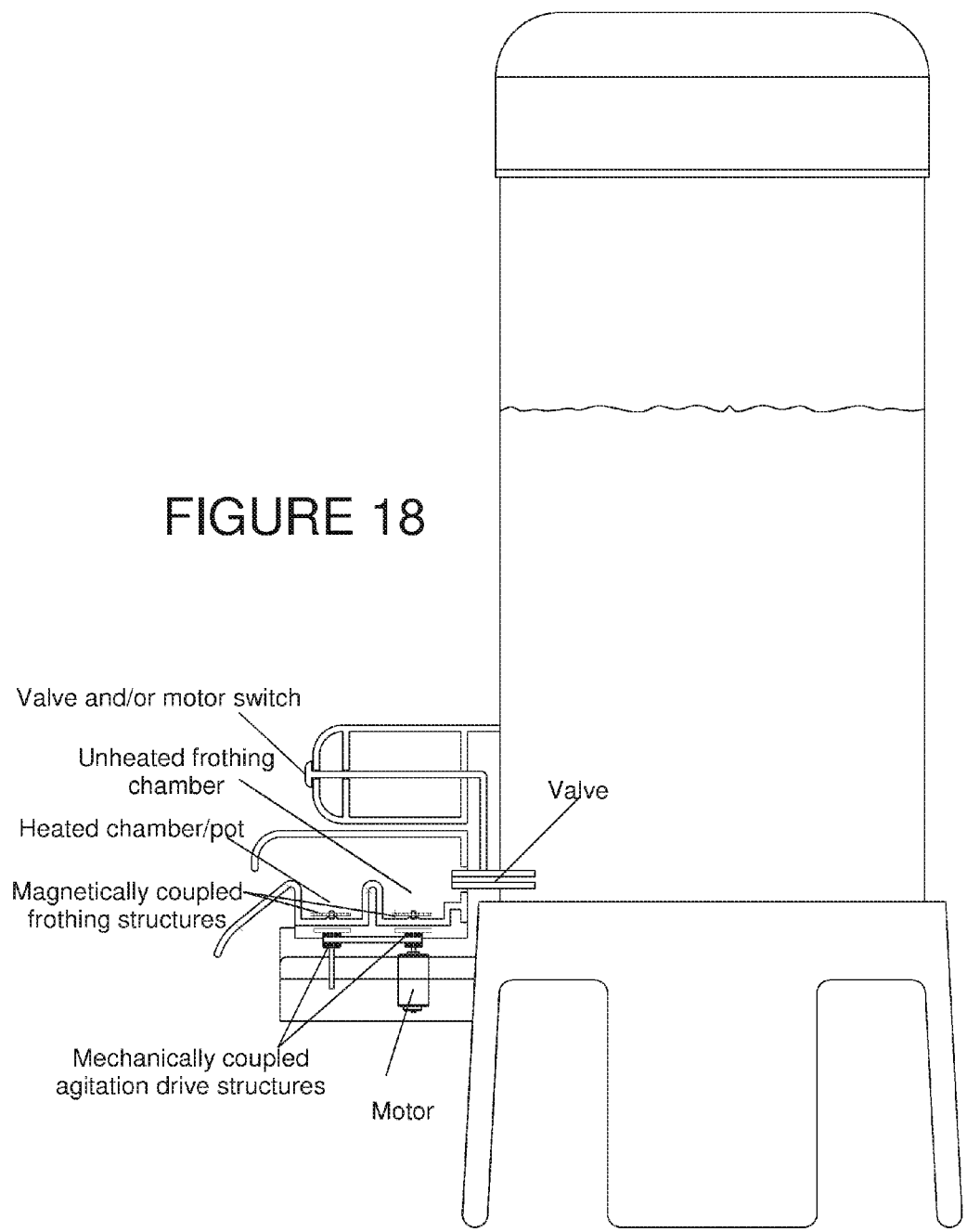
FIG. 18 is a side sectional elevation of a generally bottom dispensing, frothing "urn" similar to that of FIG. 16, but showing additional/alternative details.

In FIGS. 16-18, pressing the "dispense" button or lever opens a valve (purely mechanical, or electromechanical), and usually simultaneously starts the impeller motor(s). In some embodiments, it also initiates a heating cycle in one area or another of the device which may be for a timed interval. In other embodiments, the heated area is controlled by another switch and/or logic driver sequence. And in yet other embodiments, the entire main larger holding vessel is heated and kept relatively at temperature. In some embodiments, this is done with a separate appliance (microwave etc.), and in other embodiments it is done within this main vessel itself. One particularly good way is to use a double-boiler configuration so as to not scald the milk/fluid.

The proper temperature for frothed milk/almond milk/soy milk etc. is considered to be between 140 and 158 which makes it an appropriate holding temp for both food safety and proper serving temp of milk.

It can also be seen that the unit can be built as a cartridge system. In one embodiment as depicted there is a generally larger tank for the milk/fluid and then there is a separate, generally smaller area/well for processing. As already described, that smaller area/well in some embodiments remains heated to maintain safety, and the first tank stays relatively cool/cold. In this way, the second tank can be washed easily, while the first tank may be refrigerated. A way of actively coupling and decoupling the impeller drive is also disclosed.

It has been found that while keeping a part of the fluid heated, milk especially can form a "skin" on the surface. As such it has been found that it is sometimes advantageous to have the unit have a standby mode which actives the impeller, intermittently, slowly, constantly slowly, at timed intervals after another action, based on temperature or any of the above. In this way the milk or fluid that is being held at a safe temp +140 degree Fahrenheit, may be made to not curdle or form a tough skin on its surface. A purge function may also be incorporated for the same reasons, as well as just freshening the fluid, whether it be in the main holding area, or the frothing chamber, or the conduit between/contiguous to the two, or even the exit spout/area from the frothing chamber/area.

Referring to FIG. 17, A generally top dispensing, frothing "Air-Pot" for milk or hot chocolate or other fluid. This embodiment also discloses a variant that is also applicable to other embodiments. In this embodiment two (or more) separate but associated zones are included. Both may be frothing zones, or only one may be. As has already been touched upon, frothing can often be more effective on a cold(er) fluid. Yet there is a desire for warm froth. As such, one embodiment utilizes a structure where the frothing occurs in a cold zone, and then flows/froths/is displaced as has already been described, usually over a dam-wall, to a heating section, where further frothing mayor may not occur, and flows, and fluid flow/displacement may also occur over another dam-wall providing time for the fluid-froth time to be heated. In this figure it can also be seen that the impeller(s) is magnetically coupled to its driving member(s) further enabling the sub-unit to be easily decoupled as a cartridge for cleaning, and also providing for an easier to clean appliance part. In this embodiment, it can be seen that the two driving members are coupled together via a belt or other suitable structure.

FIG. 18 is essentially a combination of FIGS. 16 and 17 and as such serves to further illustrate that various aspects of each of the disclosed embodiments may be combined with various elements of any of the other embodiments to achieve different and desired results.

Another embodiment involves embedding any of the aforementioned embodiments into another appliance. One such appliance could be a coffee maker. Thus, a coffee maker could have an area or ability to house another fluid such as milk (optionally removable and able to be separately washed/refrigerated), and this coffee maker or other appliance would have the other inventive structures already disclosed to enable it to create frothed beverages and/or frothed/agitated beverage toppings etc. In some embodiments the entire process is automated, mechanically, or through a microprocessor etc., creating the drinks automatically for the user. In this way the user can indicate intent, and the appliance can alter the parameters such as proportions of coffee (or other beverage) to froth, frothing/agitation time, whether the froth is dispensed into the cup/vessel first, last, or some combination between with reference to the other fluids/foods/ingredients being dispensed.

Also, it should be noted that a multitude of heating methods may be employed, resistance, inductive, microwave etc. and still be within the spirit and scope of the present invention.

Referring to figures another embodiment will be described. Here the milk/coco/fluid is heated on the way to the frothing sub-chamber area. The fluid is metered onto a coursework\labyrinth, whereby it can be heated in a slower manner and thus not scald the fluid and furthermore the residue will not burn as badly when the deck/coursework is "dry." The coursework can be as simple as a single, straight path, or as an undulating (vertical or horizontal) and/or weaving path work that maximizes lineal travel in given area for maximum efficiency in energy and space. As has already been described, but will be again, is also anticipated is that there may be multiple stages of frothing in both the vertical direction (multiple impellers, and/or stairs) or the horizontal direction (stairs, and or multiple dam walls). So, there may be multiple impellers arranged generally in sequential line (horizontally) with each other; each refrothing and/or adding froth. There may be multiple dam walls, each leading to a new frothing chamber(s) which mayor not have additional frothing agitators. In addition, there may be multiple impellers and dam walls generally aligned vertically. So there may be multiple impellers/agitators on a single or multiple shafts arranged generally vertically, or multiple dam or retention walls, likened to stair-steps arranged generally vertically. And these may be combined to achieve multiple stages of frothing with the agitators, and controlled flow with the dam-retention walls in all directions/dimensions vertical and horizontal to achieve the desired functional results. Also anticipated is that in those embodiments where the unit is relatively fixed (nonpitcher like) and the user dispenses into another vessel; that the dispensing spout itself may be tipped downward relative to the rest of the device. In this way, the frothed fluid may be dispensed and this action may optionally turn unit on and optionally open valve which allows fluid into the frothing chamber(s) and then when the spout is "un-tiped" into its original position it may also be canted/slanted back to prevent dripping and to also put the milk after the froth has fallen back into a food temperature "safety zone".

Below is an analysis of different types of units currently available and the invention(s) at hand.

| Basic formats: | Technology Employed: |
|---|---|
| 1) Espresso machine | Steam based |
| 2) Manual Carafe unit | Screen plunger |
| 3) Stick based units | Disk/impeller |
| 4) Electric Carafe units | Disk/impeller |
| 5) Pour to Froth -present invention | Disk/impeller |

Problems with Other Formats/Units
1) Espresso machine steamer
a) Requires heat up time
b) Adds water to the milk
c) Requires separate frothing carafe—additional dish to clean
d) ideally you pre-cool the frothing carafe
e) Requires technique—Traditionally a frustrating experience
f) Requires high temperature/high pressure steam
2) Manual Carafe-pump-screen unit
a) Requires manual effort
b) Inferior froth
c) Fragile-often breaks
d) Creates too little or too much froth.
e) Slow process
3) Stick based units
a) Cannot add froth to an existing cup, unless you use a separate frothing cup.
b) Needs to be rinsed after every use
c) Requires the user to do the extra steps of pouring milk and then frothing.
4) Electric Carafe units
a) Difficult to clean
b) Creates too little or too much froth.
c) Expensive
d) Takes a long time to process
e) Requires A.C. power
f) Slow process The Nespresso Aer03 took 1:45 to froth/heat and 2:30 to heat with low froth disk.

The Capresso FrothPro takes 5 minutes. It is a much larger volume than the Nespresso "Pour to Froth" or the invention(s) of this disclosure has these advantages:

1) Able to only froth what is needed. Some units have to froth too much minimum batch size. And also able to froth as much as is needed-some only froth enough for one-2 beverages.

The Starbucks unit can process 5 oz. of milk whereas one version of this invention can process 21 oz. of milk.

2) Froth is fresh and not sitting
3) Fast process

The Nespresso Aer03 took 1:45 to froth/heat and 2:30 to heat with low froth disk.

The Capresso FrothPro takes 5 minutes. It is a much larger volume than the Nespresso 4) Take it from the fridge, pour and put it back.

can froth coco

Can be microwaved (without power lid) for heating and then frothing.

Or froth first and then microwave which stiffens the froth.

Or The unit may sit on a warming plate/or have one built in for service style/Starbucks buffet enviorns.

Unlike a hand held wisk, you can actively add froth to an existing/in process cup of coffee etc.

Lidded like the tube of a tea kettle to keep the milk fresh

The traditional multiple steps of:
1) pouring milk into a frother,
2) frothing
3) pouring/spooning froth from frother to cup
4) washing frother is reduced to pouring froth from the unit into a cup.

Because the volume of the milk expands, other units often can only froth about enough for one drink at a time. So often they are limited in volume. Also, milk does not froth nearly as well once it is warm versus it being cold. So once the unit has prepared one beverage/gone through a cycle, frothing capability is diminished and continues to diminish as the unit heats up. Some units will not run a second cycle until the carafe is cooled by ambient air or under running water.

These units also take a long time to prepare the beverage anywhere from 2 minutes to 5 minutes. Those that are able to froth greater quantities take longer and additionally require the user to make larger quantities for the unit to operate properly. So the units that make a single serving and those that make more have little to no control over the quantity of the batch. One is stuck with the batch size designed into the machine.

Able to only froth what is needed. Some units have to froth too much-minimum batch size.

And also able to froth as much as is needed-some only froth enough for one beverage.

Froth is fresh and not sitting can froth coco

Can be microwaved (without power lid) for heating and then frothing.

Or froth first and then microwave which stiffens the froth.

Or The unit may sit on a warming plate/or have one built in for service style/Starbucks buffet enviorns.

Unlike a hand held wisk, you can actively add froth to an existing/in process cup of coffee etc.

Lidded like the tube of a tea kettle to keep the milk fresh

The traditional multiple steps of:
1) pouring milk into a frother,
2) frothing
3) pouring/spooning froth from frother to cup
4) washing frother are reduced to pouring froth from the unit into a cup with the Cafe Barrista-pour to froth carafes and dispensers.

I claim:

1. A device for frothing liquids comprising;
   a. a vessel for holding said liquids,
   b. a motor,
   c. an agitator coupled to said motor,
   d. a well structure,
   e. a flow orifice between said vessel and said well structure, where the flow from said vessel and said well structure is restricted to maximize the frothing in said well structure.

2. The device of claim 1 further including a switch where said motor is energized when said vessel is pivoted from a generally vertical orientation into a generally horizontal orientation.

3. The device of claim 1 where the flow from said vessel and said well structure occurs when said vessel is pivoted from a generally vertical orientation into a generally horizontal orientation.

4. The device of claim 1 where the well structure is further defined as having a wall structure generally distal to said flow orifice and said wall structure has an opening allowing frothed liquid to escape.

5. The device of claim 1, further characterized in that said agitator is comprised of at least two spaced apart rotors.

6. The device of claim 5, where said rotors are disks.

7. The device of claim 1, where said vessel is further characterized as having an upper portion and a lower portion.

8. The device of claim 7 where said lower portion comprises a singular vessel and where said upper portion contains said motor, said agitator, and said well structure.

9. The device of claim 1, further characterized in that said agitator is comprised of at least two spaced apart rotors.

10. The device of claim 1, further characterized in that said vessel for holding said liquids is positioned generally above, gravitationally, said well structure.

11. A device for agitating liquids comprising;
    a. a vessel for holding said liquids,
    b. a lid which generally closes off a portion of said vessel,
    c. a motor,
    d. an agitator coupled to said motor,
    e. a well structure,
    f. a flow orifice between said vessel and said well structure, where the flow from said vessel and said well structure is restricted to maximize the frothing in said well structure, where said motor, said agitator, and said well structure are disposed in said lid structure.

12. The device of claim 11, where said flow orifice is a connecting conduit between said vessel and said lid.

13. The device of claim 11, further including a switch where said motor is energized when said vessel is pivoted from a generally vertical orientation into a generally horizontal orientation.

14. The device of claim 11, where the well structure is further defined as having a wall structure generally distal to said flow orifice and said wall structure has an opening allowing frothed liquid to escape.

15. The device of claim 11, where said agitator is at least one disk.

16. A device for agitating liquids comprising;
    an upper portion and a lower portion,
    where said lower portion further characterized as being a vessel adapted for holding liquid; and where said upper portion houses;
    a) a motor,
    b) an agitator coupled to said motor,
    c) a well structure,
    d) a flow orifice between said lower portion vessel and said well structure, where the flow from said lower portion vessel and said well structure is restricted to maximize the frothing in said well structure, where said motor, said agitator, and said well structure are disposed in said upper portion.

17. The device of claim 16, further including a first switch where said motor is energized when said vessel is pivoted from a generally vertical orientation into a generally horizontal orientation.

18. The device of claim 17, further including a second switch, where said second switch selectively enables said first switch.

19. The device of claim 16, where the well structure is further defined as having a wall structure generally distal to said flow orifice and said wall structure has an opening allowing frothed liquid to escape.

20. The device of claim 16, where said agitator is at least one whisk like structure.

* * * * *